Nov. 25, 1941.                W. O. LYTLE                2,264,244
                             GLASS BLACKBOARD
                            Filed June 4, 1938

INVENTOR.
WILLIAM O. LYTLE
BY Bradley & Bee
ATTORNEYS.

Patented Nov. 25, 1941

2,264,244

UNITED STATES PATENT OFFICE 2,264,244

GLASS BLACKBOARD

William O. Lytle, New Kensington, Pa., assignor to Pittsburgh Plate Glass Company, Allegheny County, Pa., a corporation of Pennsylvania Application June 4, 1938, Serial No. 211,881

5 Claims. (Cl. 35—66)

The present invention relates to blackboards and more particularly to a glass blackboard comprising a base portion of ordinary glass and having a vitreous enameled surface containing an abrasive material uniformly distributed therein.

The primary object of my invention is to provide a glass blackboard which will take chalk or crayon marks well, erase easily, which is durable, and which will not have any appreciable specular reflection of light.

The advantages of my invention will become more readily apparent from the following detailed description in conjunction with the accompanying drawing, wherein.

Briefly described, my invention relates to a glass blackboard having a base portion which may be formed of ordinary glass and having a vitreous enameled surface containing an abrasive material uniformly distributed thereon. The blackboard may be provided with a colored coating or backing for the rear surface.

Figure 1:
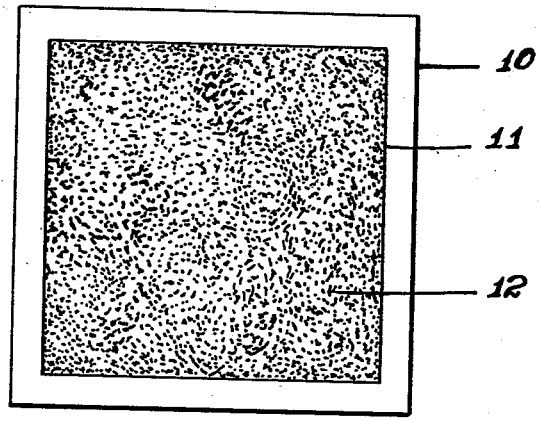
Figure 1 is a plan view of a glass blackboard embodying my invention.
Figure 2:
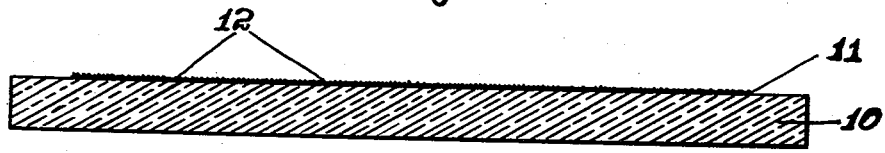
Figure 2 is a cross-sectional view of a glass blackboard showing an abrasive coated surface thereof.

Referring to Figures 1 and 2, a glass sheet 10 is provided with a layer of opaque enamel 11 containing an abrasive material 12. The opaque enamel may be suitably prepared by several different methods. By one method, from about 25 per cent to 50 per cent, by weight, of a powdered abrasive material, such as chromite, sand, silicon carbide, or beta alumina is mixed with from 50 per cent to about 75 per cent, by weight, of powdered glass with suitable amounts of a flux, such as lead borate, and a coloring agent, such as a metallic oxide.

By another method in which the opaque enamel is applied to cold glass sheets, the enamel is prepared as follows: The above-mentioned abrasives, in the proportions stated, are mixed with an aqueous or an organic vehicle containing a small amount of a binding agent, such as sugar, molasses, or dammar varnish. In case an organic vehicle is desired, turpentine or leptyne may be utilized.

The opaque powdered enamel prepared by the first method may be formed upon the surface of the glass sheet 10 by applying a layer of the powdered enamel to the surface of a molten glass bath from which the sheet is drawn. If desired, the powdered enamel may be preheated to a temperature of about 200° F. and pressed or rolled into the glass sheet, while maintaining the sheet in semi-plastic condition at temperatures of about 1500° F. to 1800° F.

The opaque enamel prepared by the second method may be applied in the form of a liquid suspension to a cold glass sheet in the following manner. The liquid enamel is brushed or sprayed upon the sheet until a film of the desired thickness is obtained. The sheet is then dried to eliminate the volatile vehicle therefrom. The sheet is then fired to a temperature of from about 1100° F. to 1200° F. to vitrify the enamel and to eliminate the organic binding agent therefrom, and it may be cooled slowly through the annealing range of temperatures, or if desired, it may be suddenly cooled to temper the sheet. It will, of course be understood that the exact temperature to which the sheet is heated will depend upon the kind and amount of binding agent utilized in the enamel.

Various colors may be produced in the surface of the blackboard by using an opaque enamel containing suitable amounts of the following coloring agents:

Yellow—barium chromate, lead chromate, or uranium compounds

Red—ferric oxide or basic lead chromate

Blue—cobalt oxide, toned by the oxides of aluminum, zinc or chromium

Black—cobalt oxide with ferric oxide or manganese dioxide

Green—chromic oxide or copper oxide with potassium bichromate

White—stannic oxide, zirconium oxide, or finely ground porcelain.

By the methods described above, a glass blackboard may be produced having a durable abrasive surface thereon which will take chalk readily, erase easily, and which is substantially free from specular reflection of light.

The foregoing detailed description has been given for clearness of understanding only and no limitations should be imposed upon the appended claims which should be construed as broadly as permissible in view of the prior art.

What I claim is:

1. A glass blackboard comprising a base portion of ordinary glass and having an enameled surface containing an abrasive material uniformly distributed therein.

2. A glass blackboard comprising a base portion of ordinary glass and having an enameled surface containing powdered chromite uniformly distributed therein.

3. A glass blackboard comprising a base portion of ordinary glass and having one surface thereof covered by a layer of vitreous opaque enamel containing an abrasive material uniformly distributed therein.

4. A glass blackboard comprising a base portion of ordinary glass and having one surface thereof covered by a layer of vitreous opaque enamel containing powdered silicon carbide uniformly distributed therein.

5. A glass blackboard comprising a base portion of ordinary glass and having one surface thereof covered by a layer of vitreous opaque enamel containing powdered beta alumina uniformly distributed therein.

WILLIAM O. LYTLE.